United States Patent [19]
Alpen et al.

[11] 4,060,672
[45] Nov. 29, 1977

[54] ELECTROCHEMICAL ENERGY CELL WITH SOLID ELECTROLYTE

[75] Inventors: Ulrich Von Alpen, Stuttgart; Jürgen Fenner, Ostfildern; Joachim Marcoll, Ludwigsburg; Albrecht Rabenau, Stuttgart, all of Germany

[73] Assignee: Max-Planck-Gesellschaft zur Forderung der Wissenschaften e.V., Gottingen, Germany

[21] Appl. No.: 681,642

[22] Filed: Apr. 29, 1976

[30] Foreign Application Priority Data

Apr. 30, 1975 Germany .............................. 2519351
Nov. 15, 1976 Germany .............................. 2551346

[51] Int. Cl.² ...................................................... H01M 6/18
[52] U.S. Cl. .................................... 429/191; 429/199
[58] Field of Search .................... 429/191, 188, 30, 33, 429/199

[56] References Cited

U.S. PATENT DOCUMENTS

| 3,065,289 | 11/1962 | Lieb | 429/191 |
| 3,078,327 | 2/1963 | Lieb | 429/191 |
| 3,558,357 | 1/1971 | Oakahashi et al. | 429/191 |
| 3,575,715 | 4/1971 | Masters et al. | 429/191 X |
| 3,598,654 | 8/1971 | Huden | 429/191 |
| 3,647,549 | 3/1972 | Christie et al. | 429/199 X |
| 3,725,132 | 4/1973 | Moser et al. | 429/191 |

Primary Examiner—Charles F. LeFevour
Attorney, Agent, or Firm—Blum, Moscovitz, Friedman & Kaplan

[57] ABSTRACT

Electrochemical cells utilize crystalline chalcogen halides as solid electrolytes. Processes for the manufacture of the chalcogen halides and of the solid electrolyte cells are disclosed.

5 Claims, 3 Drawing Figures

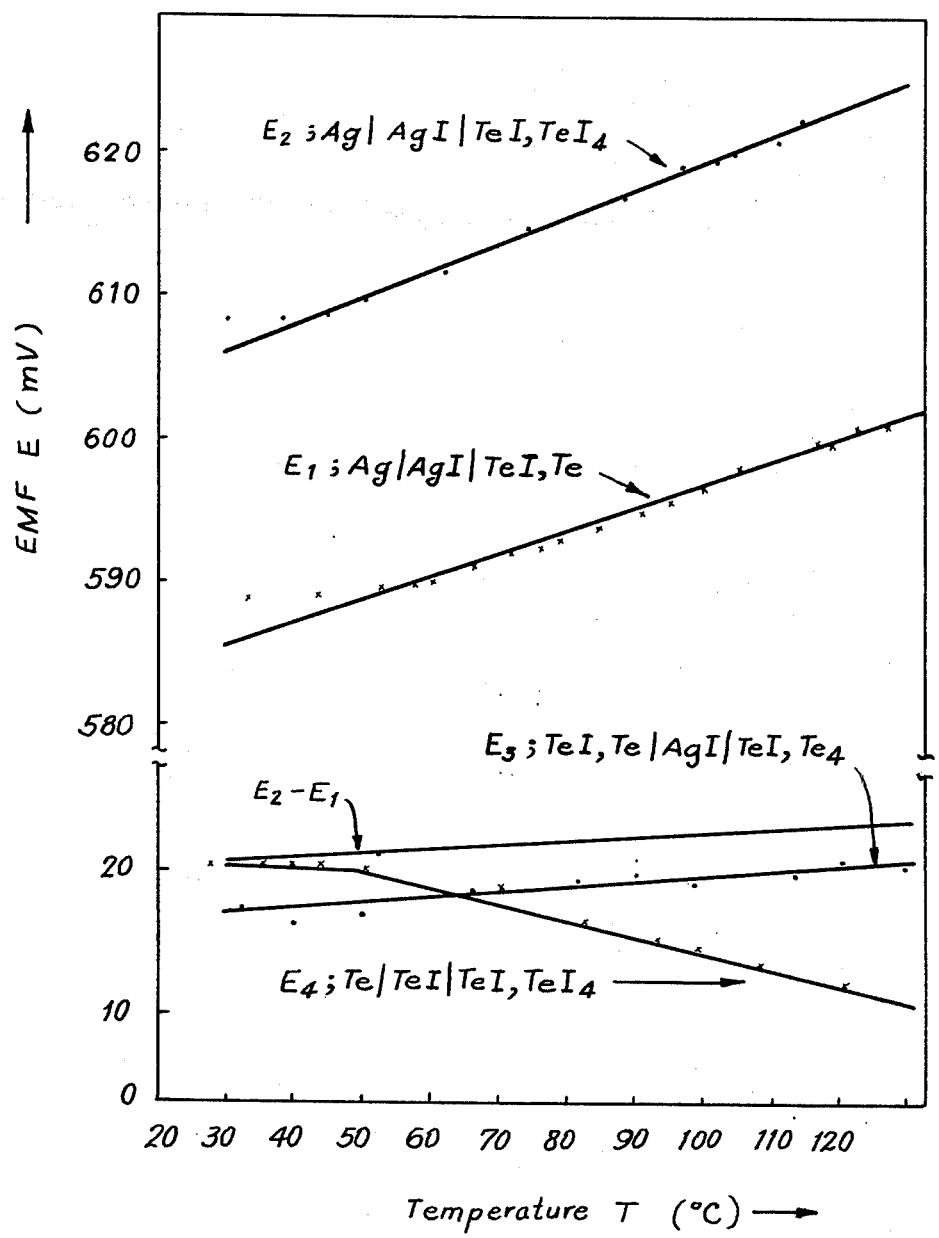

ELECTROCHEMICAL ENERGY CELL WITH SOLID ELECTROLYTE

BACKGROUND OF THE INVENTION

The invention relates to energy cells containing certain chalcogen halide compounds as ionic conduction components and a process for the manufacture thereof.

So-called solid electrolytes are already known, and new types of batteries and fuel cells have been built or have been proposed utilizing such electrolytes. These solid electrolytes are also called super-ionic conductors or optimized ionic conductors. The known ionic conductors are divided into three groups according to "J. Solid State Chemistry" 4, 294, 310 (1972), i.e., 1. Ionic compounds that are characterized by a disordered cationic phase, as for example in the silver halides and silver chalcogenides. 2. The isomorphous series of hexagonal compounds with the so-called beta-aluminum oxide structure. 3. Defect-stabilized ceramic oxides with the calcium fluoride structure.

The possibility of using these ionic conductors in energy cells rests upon the postulate that in all cases a very slight electronic conductivity is combined with a high ionic conductivity. The use of these ionic conductors in an energy cell, as for example, a so-called ionic battery or a galvanic cell, is accomplished by using the actual ionic conductor to separate the various electrode materials that supply the driving force for the electrochemical reaction. By so doing, the ionic conductor as "solid electrolyte" replaces the electrolytic solutions that have heretofore been customary, and eliminates the problems that arise from the presence of a liquid phase. As to the heretofore-known energy cells including solid electrolytes, such solid electrolytes have been used only in conjunction with liquid electrodes.

In energy cells with ionic conductors or solid electrolytes, the electrode materials can consist of solids, liquids or gases. For the attainment of a substantial electromotive force, the solid electrolytes should consist of at least one electro-positive and one electro-negative material.

Previously-known energy cells with solid electrolytes or ionic conductors despite their great theoretical possibilities, still shown many disadvantages, and these disadvantages have impeded their technical utilization, e.g., the electro-chemical reaction at the boundary surfaces of the solid electrolytes leading to serious corrosion problems. A further drawback with respect to ionic conductors as encountered in previously known galvanic cells, is the fact that the ionic conductivity becomes adequate for carrying out electrochemical reactions only at temperatures above 150° C and up to about 350° C, (cf. J. Phys. Chem. Solids, 34, 1199 (1974)).

Further disadvantages are the often very high prices for many of the materials, and the exceedingly high weight in the case of other materials.

SUMMARY OF THE INVENTION

According to the present invention an energy cell contains at least one ionic conductor component disposed between electrodes, the cell being characterized in that the ionic conductor material consists totally or partially of chalcogen halide having the general formula $$Cu_xCg_yX_z$$

wherein $X$ denotes chlorine, bromine or iodine, $x$ denotes the numbers 0 or 1, $y$ denotes a number greater than or equal to 1, and in the case wherein $x = 0$, Cg is tellurium and $z$ is a number greater than or equal to 1, and in the case where $x = 1$ Cg is selenium or tellurium and $z$ is the number 1.

Tellurium sub-halides are prepared by fusion of tellurium and the corresponding tellurium halide, followed by slow cooling. Alternatively, tellurium can be heated in the presence of a gaseous halide in a pressure vessel.

To make electrical contact between electrodes and leads such as wire leads, selected small regions of tellurium sub-halides are heated until they decompose to molten tellurium. Gold or platinum wires are readily wet by the molten elemental tellurium to make good contact.

The fundamental purpose of the invention is to eliminate the aforementioned disadvantages in toto, or at least in part, and more especially to create an energy cell with solid electrolytes wherein the ionic conductivity becomes sufficient at substantially lower temperatures than has heretofore been the case.

A further object of the invention is to create an energy cell of the type containing an ionic conductor that can be used both as solid electrode and as solid electrolyte.

A significant object of the invention is a solid-electrolyte cell of higher energy density (stored energy divided by weight) than has hitherto been available.

An important object of the invention is a method of construction of an electrochemical cell having a solid electrolyte.

Yet another object of the invention is a method of manufacture of solid electrolyte for use in electrochemical cells.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a graph of the EMF vs. temperature of cells in accordance with the invention.

DESCRIPTION OF THE PREFERRED EMBODIMENTS

Figure 1:
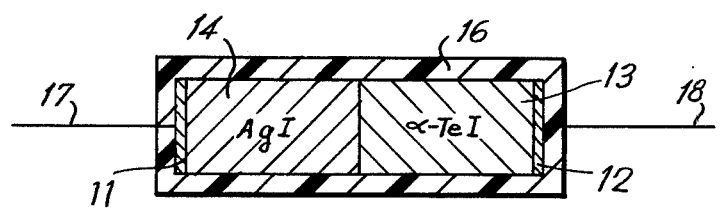
FIG. 1 is a cell embodying the invention.

The chalcogen halides used in the energy cell according to the invention are known and are described, for example, in Applied Chemistry 86, 11 (1974), and Z. Anorg. Chem. 374, pp. 43-53 (1970).

The electrochemical cells of the present invention find their principal utility as replacement for solid-electrolyte cells based on the use of silver, the copper in the cells of the present invention being substantially lower in cost than the silver, at least part of which is replaced by Te or Se. The same applies with reference to the tellurium halides replacing the $RbI_3$ as iodine electrode.

In addition, the cells in accordance with the present invention can be used at substantially lower temperatures than can solid electrolyte cells of the prior art.

In the cases of the sub-halides of tellurium, stable phases of the corresponding tellurium-halide system are involved from the crystallographic standpoint. Within the framework of the invention, α-TeI as the stable phase in the TeI$_4$/Te system, Te$_3$Cl$_2$ in the TeCl$_4$/Te system, and Te$_2$Br in the TeBr$_4$/Te system are preferred. These substances represent all modifications of the known Te structure. The sub-halides of the tellurium used according to the invention are distinguished essentially by a high tellurium content and the unsaturated character of the tellurium resulting therefrom.

The manufacturing of said tellurium sub-halides can be done either according to known methods or in a substantially simpler manner according to the present invention by simple fusion of tellurium and halogen, and subsequent slow cooling for formation of the crystals. When this is done, it is advantageous to use an excess of halogen and conduct operations under autogenic pressure. For example, gaseous halogens in frozen state can be introduced with tellurium into a pressure vessel, and the heating can then be carried out. Excess halogen that is present over and above the stable compounds can then be simply evaporated off.

Again, within the framework of the invention, α-TeI and Te$_3$Cl$_2$ are used preferably as the ionic conductor material. The α-TeI is characterized by Te$_4$I$_4$ molecules, which form a layered structure with the atom sequence TeTeITeTe. In the Te annular layers an iodine channel runs between each series of molecules. The non-planar 4-membered ring of Te atoms contains two-, three-and four-bonded Te atoms. The compound forms large monocrystals in the triclinic crystal system.

The Te$_3$Cl$_2$ is distinguished by two-fold Te chains, having in each case, a trigonal pyramidal Te atom, which joins two chlorine atoms per chain period. Also, this substance forms large mono-crystals in the monoclinic crystal system, likewise in a layered structure. For this reason, the crystals are readily amenable to cleaving.

Further ionic conductor materials utilized according to the invention correspond to the formulae Te$_2$Cl, Te$_2$Br and β-TeI. However, the chlorine compound and the iodine compound of these formalae are less stable than the other known tellurium sub-halides.

The tellurium sub-halides used according to the invention are distinguished in that their conductivity increases by three to five powers of 10 suddenly at 140° C. It is assumed that this sudden change in the conductivity is due to the liquefaction of a halogen sublattice. Simultaneously therewith, ionic conduction results and leads to the observed great inrease in conductivity.

The fundamental absorption on the electronic band edge of the sub-halides shows an allowed zone width of between 1.3 eV and 1.5 eV. The spectrum of the electronic basic absorption is distinguished by a strong supplementary absorption linearly dependent upon the energy, which increases considerably with rising temperatures, and which disappears at the liquid nitrogen or helium temperature. It is assumed that this supplementary absorption dependent upon temperature is characteristic of an increasing degree of disorder in the crystal.

A further group of ionic conductor materials used according to the invention consists of copper chalcogenide halides of the aforementioned general formula, to which, for example, the following belong: CuSe$_2$Cl, CuSe$_3$Br, CuSe$_3$I, CuTeCl, CuTe$_2$Cl, CuTeBr, CuTe$_2$Br, CuTeI and CuTe$_2$I. These copper chalcogenide halides are characterized by a high ionic conductivity on the basis of low occupancy probabilities of the Cu+ ions in the temperature range between 30° and 250° C. The compounds lend themselves to production by hydrothermal synthesis in the corresponding hydrohalic acid, or by a reheating a stoichiometric mixture of copper (I) halogenide and selenium or tellurium. The hydrothermal synthesis process is described by H. Rau and A. Rabenau in Mater. Res. Bull. 2 609 (1967), incorporated herein by reference.

CuTeI is used preferably within the framework of the invention. CuTeI crystallizes in the space group I4$_1$/amd, and is characterized mainly by incomplete Cu layers. The structure of the crystals is distinguished essentially by four-fold Te helices, upon which four-fold Cu helices are superimposed. The figure for the occupancy probabilities of the Cu+ ions in the Cu helices stands at about 50%. The Cu helices are combined with one another across edge-linked iodine tetrahedrons. At the centers of gravity of the iodine tetrahedrons are Cu ions that occupy with 50% probability the possible places. Parallel to the iodine tetrahedrons, one distorted tetrahedron lies in each pair of edge-linked tetrahedrons, in the centers of gravity of which Cu layers are found with 20% occupancy probability.

Conduction of ions and transference numbers of CuTeI were determined by the conventional coulometric transference method (cf. H. Rickert, "Introduction to the Electrochemistry of Solid Substances", Springer-Verlag, Berlin, 1973). The transference number at 250° C is 1, and the specific electric conductivity δ is greater than $10^{-2}$ ohm$^{-1}$cm$^{-1}$. In order to exclude any electronic conductivity component, the transference measurements were compared with one another on the two systems Pt/Cu/CuBr/CuTeI/CuBr/CuPt and Pt/Cu/CuTeI/Cu/Pt.

In both cases the measurements yielded a transference number for Cu+ of 1 at 250° C. Polarization measurements yielded a decomposition voltage of 150–200 mV at 250° C.

Preferred forms of embodiment of the invention are found in an arrangement whereby, in connection with the use of an ionic conductor material of the aforementioned general formula, wherein x is zero, at least one electrode of the energy cell consists of tellurium, and in which the tellurium sub-halides are used both as electrode and as electrolyte in the energy cell. This last requirement means that the surface of the electrode consists of metallic tellurium over a substrate of tellurium sub-halide.

Energy cells of this kind are readily suitable for manufacturing according to the invention. To make electrical contact, crystalline tellurium sub-halide is melted at the particular spot where there is to be conversion to an electrode, until elemental tellurium is formed at that spot. This melting can be done preferably by electric discharge, such as spark discharge, or by plasma discharge. For example, an α-TeI crystal can be touched at opposite points wih gold or platinum wires. When an adequate voltage is applied, for example by condenser discharge, at the contact points, elemental tellurium which is electrically-conducting is formed by the heating of the wires, and provides excellent wetting of e.g. gold and platinum wires.

According to a further form of embodiment of the invention, the aforementioned chalcogen halide compounds are used in an electrochemical solid cell in combination with good conducting solid electrolytes heretofore known. An example of a solid cell of this type, using AgI as known ionic conductor, consists of an energy cell composed of silver as the first electrode, AgI as the first ionic conduction material, α-TeI as the second ionic conduction material and simultaneously as the second electrode in that sequence. Since AgI contains mobile silver ions and α-TeI contains mobile iodine ions, the results are the obtainment of an energy cell that entails no corrosion problems and is equally effective at relatively low temperatures.

A cell of this construction is shown in FIG. 1, the active components consisting of Ag/AgI/α-TeI/Te, In this cell the first electrode 11 is Ag, the second electrode 12 is formed on the end surface of second solid electrolyte 13 by heating said surface to the decomposition temperature. The first electrolyte 14 is AgI. The cell is encased in polytetrafluoroethylene jacket 16. Connection is made to the Ag and Te electrodes by means of platnium wires 17 and 18. In production models, less expensive leads of silver or copper are used.

For potentiometric measurements, the silver electrode is conveniently formed by compression of highly pure elemental Ag pellets etched in nitric acid to remove traces of oxide or sulfide. The AgI component is pressed from AgI purified by melting in an iodine stream. TeI is pressed from powder obtained by milling highly-purified TeI crystals. Carbon (not shown) may be used in combination with the tellurium electrode. Where used, the carbon is in the form of graphite, purified by heating at 1200°C in vacuum for two days, and stored in argon. The platinum electrodes are cemented with a conductive cement or are soldered. The Teflon case serves to prevent loss of iodine by diffusion. In the cell of FIG. 1, termed Cell I $$AG \rightleftarrows Ag^+ + e, TeI + Ag^+ + e \rightleftarrows AgI + Te$$

The cell reactions are:

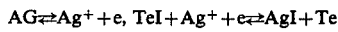
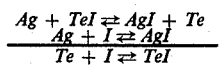

The cell voltage is derived from $-nFE_I = \Delta_R G°\lambda_{AgI} - \Delta_R G°_{TeI}$ Another embodiment of an energy cell in accordance with the invention is a galvanic cell with liquid or gaseous electrodes, in which a hydrogen halide corresponding to the particular solid electrolyte halide involved is present.

A further example of a cell according to the invention is constructed from platinum as the first electrode, copper, CuTeI as the first ionic conductor, and TeI as the second ionic conductor and simultaneously as the second electrode. In this case, the TeI can be set in a graphite matrix for purposes of decreasing the effects of overvoltage and polarization. This cell supplies a voltage of 300 mV at room temperature. The platinum electrodes are, of course, optional.

Figure 2:
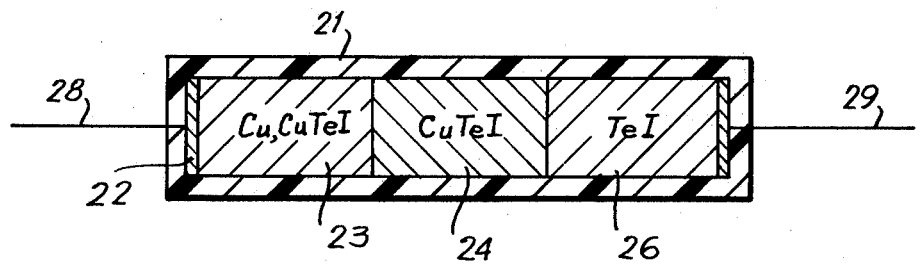
FIG. 2 is a second embodiment of the invention.

A preferred embodiment of a cell according to the present invention (FIG. 2) is constructed from copper as the first electrode 22, a mixture of copper and CuTeI as the first ionic conduction material 23, CuTeI as second conduction material 24 with TeI 26 as the second electrode having a layer 29 of Te on the surface thereof, in that sequence. The cell is contained in Teflon encasement 21. In the case of this energy cell, the problems of polarization between the Cu and TeI electrodes and the CuTeI electrolytes are eliminated in a particularly advantageous manner by the Cu- CuTeI mixture, which afford a so-called "flowing passage" between electrodes and electrolyte. The two last-mentioned cells have low resistance and are reversible, and thus can be recharged; the transference number is 1 in each case.

Additional cells of interest are as follows:

Pt/Ag/AgI/TeI, TeI$_4$/C/Pt
$3Ag \rightleftarrows 3Ag^+ + 3e^-$, $TeI + 3Ag^+ + 3e^- \rightleftarrows TeI + 3AgI$ with electrons moving to the left and Ag+ moving to the right.

The cell reactions are:

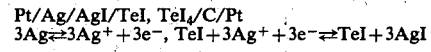
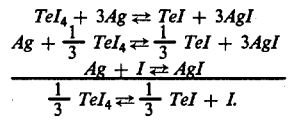

The cell voltage is derived from:

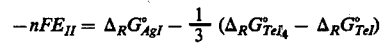

Cell III

Pt/C/TeI, Te/AgI/TeI, TeT$_4$/C/Pt $3Te + 3AgI \rightleftarrows 3TeI + 3Ag^+ + 3e$ $TeI_4 + 3Ag^+ + 3e \rightleftarrows 3AgI + TeI$ with electrons moving to the left and Ag+ moving to the right.

Cell Reaction:

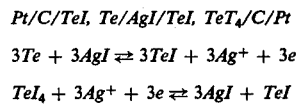

For the cell voltage: $-3FE_{III} = 4\Delta_R G°_{TeI} - \Delta_R G°_{TeI_4}$

Cell IV:

Pt/C/Te/TeI, Te/TeI, TeI$_4$/C/Pt $3Te + 3I^- \rightleftarrows 3TeI + 3e$, $TeI + 3I^- \rightleftarrows TeI_4 + 3e$ Cell Reaction: $3Te + TeI_4 \rightleftarrows 4TeI$ For the voltage: $-3FE_{IV} = 4\Delta_R G°_{TeI} - \Delta_R G°_{TeI_4}$ The temperature coefficients of the various cells are shown in FIG. 3. As is evident, the small size of the temperature coefficients makes these cells useful as standard cells which can be employed over a wide temperature range.

The energy cell according to the invention can be manufactured of low-price basic materials; it is light and has ionic conductivity at distinctly lower temperatures in comparison with material previously known, and it can even be manufactured as a kind of single body cell, in which the chalcogen halide simultaneously functions as an electrode and as ionic conduction material without any hiatus therebetween.

It will thus be seen that the objects set forth above, among those made apparent from the preceding description, are efficiently attained, and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. Electrochemical energy cell, comprising first and second electrodes and at least one ionically-conductive solid electrolyte between said electrodes, said electrolyte comprising a chalcogen halide of the formula $Cu_xCg_yX_z$ where X is selected from the group consisting of chlorine, bromine or iodine, $x$ is 1, $y$ is at least equal to 1, Cg is a member of the group consisting of Te and Se, and $z = 1$.

2. The electrochemical energy cell as defined in claim 1, wherein said chalcogen halide is CuTeI and at least one of said electrodes is of Te.

3. The electrochemical energy cell as defined in claim 1, wherein at least one of said electrodes is of Cu.

4. The electrochemical energy cell as defined in claim 1, wherein said chalcogen halide in CuTeI, and at least one of said electrodes is of Cu.

5. The electrochemical energy cell as defined in claim 1, wherein said first electrode is Cu, said solid electrolyte is in the form of three successive and contiguous chalcogen halides, the first being a mixture of Cu and CuTeI in contact with said first electrode, the second being CuTeI, and the third being a mixture of Cu and CuTeI, and said second electrode is TeI, said second electrode being in contact with said third solid electrolyte.

* * * * *

UNITED STATES PATENT OFFICE
CERTIFICATE OF CORRECTION

PATENT NO. : 4,060,672
DATED : November 29, 1977
INVENTOR(S) : Ulrich Von Alpen et al It is certified that error appears in the above-identified patent and that said Letters Patent are hereby corrected as shown below:

In column 1 of the cover page after

"[30] Foreign Application Priority Data", change

"Nov. 15, 1976" to --Nov. 15, 1975--.

Signed and Sealed this

Seventh Day of March 1978

[SEAL]

Attest:

RUTH C. MASON
Attesting Officer

LUTRELLE F. PARKER
Acting Commissioner of Patents and Trademarks